US012248844B2

(12) United States Patent
Drzymala et al.

(10) Patent No.: US 12,248,844 B2
(45) Date of Patent: Mar. 11, 2025

(54) BIOPTIC BARCODE READER AND BIOPTIC BARCODE READER ASSEMBLY

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US); Matthew Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 95 days.

(21) Appl. No.: 17/364,170

(22) Filed: Jun. 30, 2021

(65) Prior Publication Data
US 2023/0004737 A1 Jan. 5, 2023

(51) Int. Cl.
  *G06K 7/14* (2006.01)
(52) U.S. Cl.
  CPC ................... *G06K 7/1413* (2013.01)
(58) Field of Classification Search
  CPC ............ G06K 7/1413; G06K 7/10683; G06K 7/10712; G06K 7/10693; G06K 7/10831; G06K 7/10702
  USPC ..... 235/462.01, 462.14, 462.43, 462.32, 375
  See application file for complete search history.

(56) References Cited

U.S. PATENT DOCUMENTS

| 5,834,708 A * | 11/1998 | Svetal | G01G 21/28 235/462.43 |
| 8,356,749 B2 * | 1/2013 | Olmstead | G06K 7/10861 235/440 |
| 2003/0141367 A1 * | 7/2003 | Lucera | G06K 7/1098 235/462.4 |
| 2006/0131416 A1 * | 6/2006 | Jwo | G06K 7/1096 235/454 |
| 2009/0268263 A1 * | 10/2009 | Ichinose | H04N 1/00981 358/474 |
| 2012/0138672 A1 * | 6/2012 | Herwig | G06K 7/10722 235/375 |
| 2013/0328682 A1 * | 12/2013 | Shearin | G06K 7/1096 235/462.43 |
| 2017/0323128 A1 * | 11/2017 | Jaffri | G06K 7/1096 |
| 2017/0330426 A1 * | 11/2017 | Jaffri | G06Q 20/208 |

FOREIGN PATENT DOCUMENTS

JP         H07134747 A  *  5/1995

* cited by examiner

*Primary Examiner* — Edwyn Labaze
(74) *Attorney, Agent, or Firm* — Yuri Astvatsaturov

(57) ABSTRACT

Bioptic barcode reader assemblies are disclosed herein. An example bioptic barcode reader assembly includes a metal perimeter frame and a bioptic barcode reader positioned within and supported by the metal perimeter frame. The bioptic barcode reader includes an upper housing and a plastic lower housing secured to the upper housing.

14 Claims, 9 Drawing Sheets

BIOPTIC BARCODE READER AND BIOPTIC BARCODE READER ASSEMBLY

BACKGROUND

Bioptic barcode readers traditionally use housing assemblies with very heavy die cast metal lower housings. This was done primarily to provide the rigidity required to attach and support additional structures, such as sheet metal frames and scale assemblies, to the bioptic barcode reader. In particular, the rigidity provided the die cast metal lower housing provides the support need for a scale assembly to prevent deflection when an item is weighed. However, a die cast metal lower housing adds significantly to the weight of the bioptic barcode reader and requires extensive cleaning to remove the dirt, dust, and debris that can accumulate from secondary operations, such as cutting threads in screw bosses, which in turn drives up the manufacturing, product, and shipping costs significantly. Die cast parts are typically difficult to clean and improper or insufficient cleaning of the die cast parts can result in particles left from the secondary operations interfering with the optical systems of the bioptic barcode reader.

Another drawback to the use of die cast metal lower housings in bioptic barcode readers is that the imaging and optical components are partially housed within the lower housing and the die cast metal lower housing is usually extremely reflective. Therefore, the die cast metal lower housing must either be painted with a non-reflective paint or covered with another plastic part.

In addition, the lower housing is part of the scanner enclosure and often requires multiple features to be formed with the die cast metal lower housing, such as holders for mirrors or other delicate structural components. However, the hard metal surface of the die cast metal housing can chip or break the mirrors or other delicate structural components.

Since the die cast metal lower housing is also located adjacent to the main printed circuit board, it also necessitates a complex grounding design where the main printed circuit board must be grounded by a number of screws to the die cast metal lower housing, which can increase the cost and complexity of the design as well.

SUMMARY

In an embodiment, the present invention is a bioptic barcode reader assembly comprising a metal perimeter frame and a bioptic barcode reader positioned within and supported by the metal perimeter frame. The bioptic barcode reader includes an upper housing and a plastic lower housing secured to the upper housing.

In a variation of this embodiment, the bioptic barcode reader assembly comprises a sheet metal frame attached to the metal perimeter frame.

In another variation of this embodiment, the bioptic barcode reader assembly comprises a scale assembly attached to and supported by the metal perimeter frame.

In another embodiment, the present invention is a method of assembling a bioptic barcode reader assembly, comprising the steps of: assembling a bioptic barcode reader having an upper housing and a plastic lower housing secured to the upper housing; and positioning the bioptic barcode reader within a metal perimeter frame such that the bioptic barcode reader is supported by the metal perimeter frame.

In a variation of this embodiment, the method comprises the step of attaching a sheet metal frame to the metal perimeter frame.

In another variation of this embodiment, the method comprises the step of attaching a scale assembly to the metal perimeter frame such that the scale assembly is supported by the metal perimeter frame.

In another embodiment, the present invention is a bioptic barcode reader comprising a housing, an imaging assembly positioned within the housing, and a set of optical components positioned within the housing. The housing has a plastic lower housing and an upper housing secured to and extending above the lower housing.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
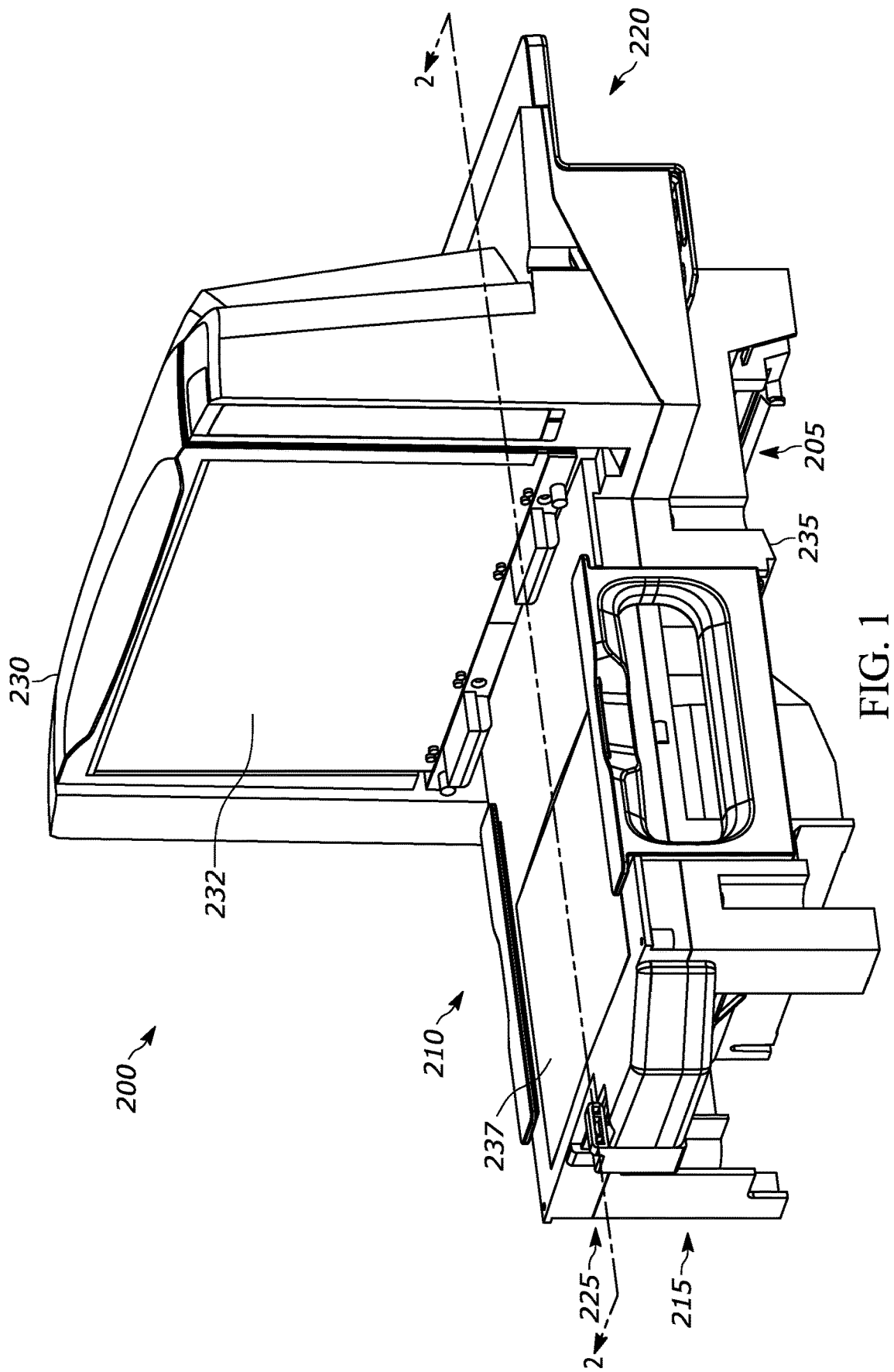
FIG. 1 illustrates a perspective view of an example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The examples disclosed herein relate to bioptic barcode readers having plastic lower housings and bioptic barcode reader assemblies having bioptic barcode readers having plastic lower housings and metal perimeter frames. The use of a plastic lower housing provides a lighter and lower cost plastic part for the lower housing, can lower the cost of the product because the lower housing does not need to be painted or additional optical coverings installed to reduce or eliminate reflection, allows for the mounting of delicate or sensitive components, such as mirrors, directly to the lower housing, etc. In addition, with a plastic lower housing, there is also no need for complicated printed circuit board grounding techniques since a simple grounding strap connected to one of the printed circuit board's connection or a spring contact could be used and optical features, such as illumination baffles, can be molded into the lower housing, which is not possible with die cast lower housings. By using a metal perimeter frame with a bioptic barcode reader with a plastic lower housing, the same rigidity is achieved as that of a bioptic barcode reader with a die cast housing, which allows the mounting and support of additional structures, such as a sheet metal frame and/or a scale assembly, while retaining the benefits of the plastic lower housing.

Figure 2:
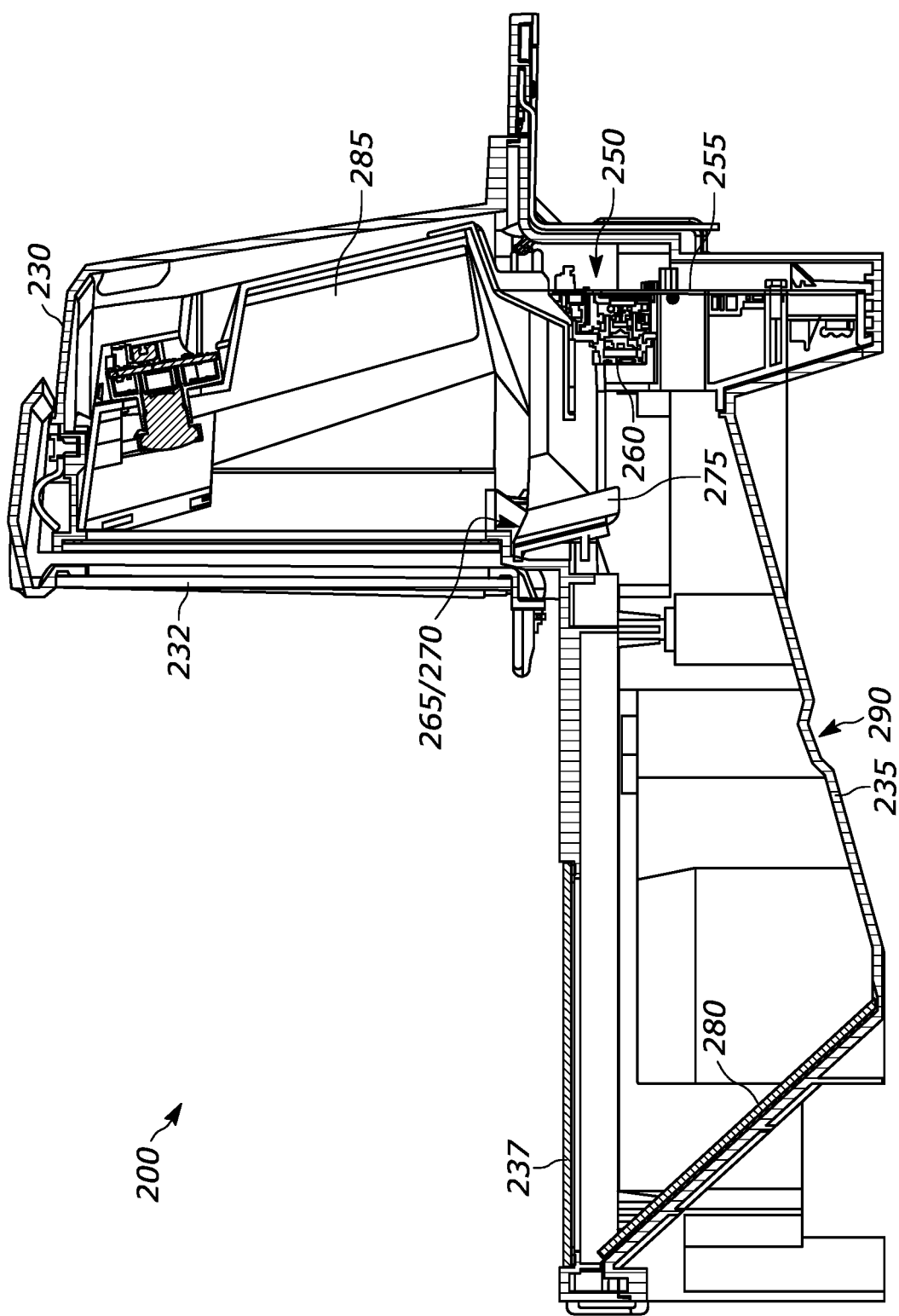
FIG. 2 illustrates a cross-sectional view of the bioptic barcode reader of FIG. 1, taken along line 2-2 in FIG. 1.
Figure 3:
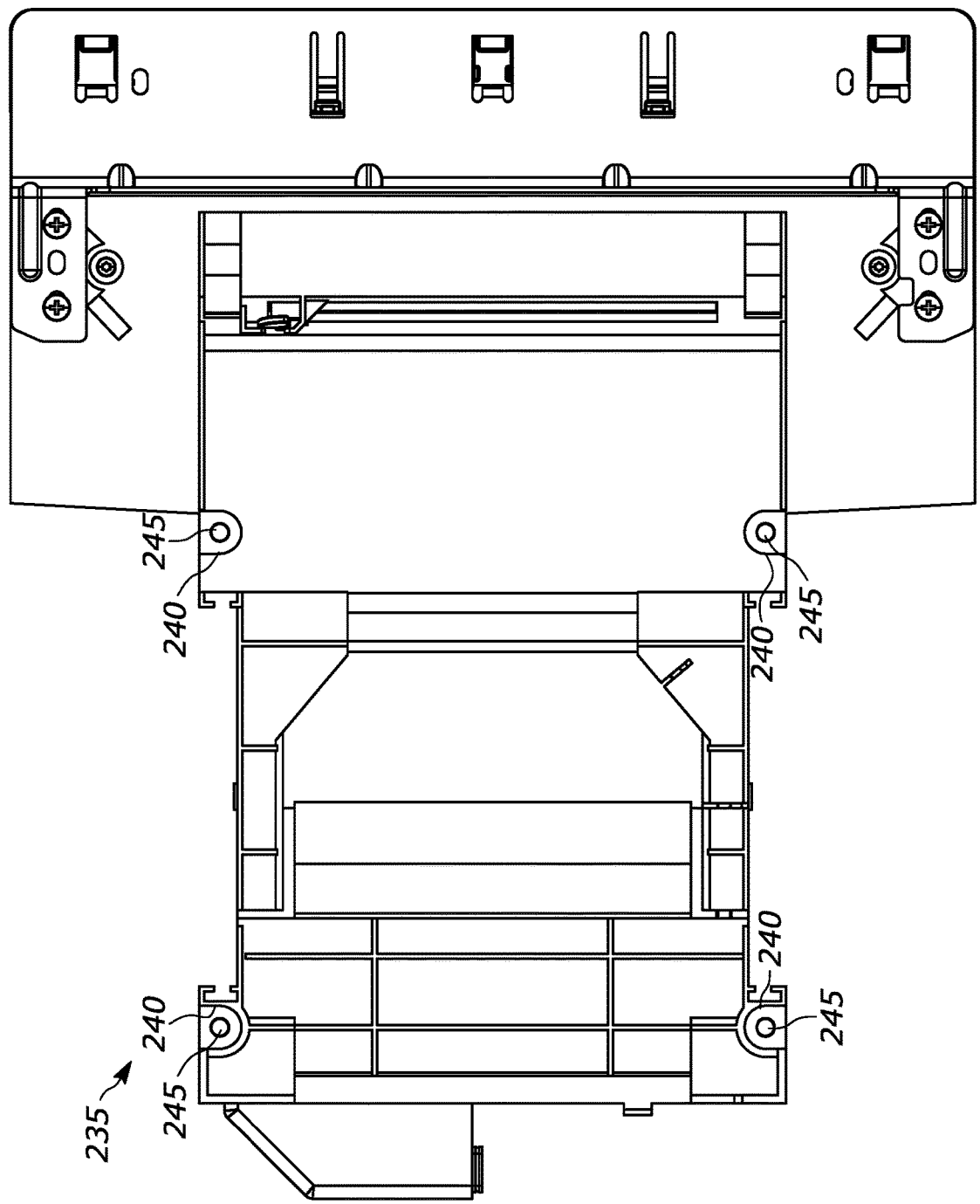
FIG. 3 illustrates a bottom view of a lower housing portion of the bioptic barcode reader of FIG. 1.

Referring to FIGS. 1-3, an example bioptic barcode reader 200 is shown that generally includes a housing 225, an imaging assembly 250 positioned within housing 225, and a set of optical components 265 positioned within the housing. Housing 225 includes a plastic lower housing 235, an upper housing 230 secured to and extending above plastic lower housing 235, for example by threaded members, a generally horizontal window 237, and a generally upright window 232. Plastic lower housing 235 can be a molded part and can be non-reflective, which eliminates the need to paint the interior of the lower housing or cover the interior with additional plastic or other non-reflective parts. Upper housing 230 can be a single, integral, unitary part or can include a middle housing portion that extends parallel to plastic lower housing 235 and includes horizontal window 237 and a tower portion, attached to the middle housing portion, that extends perpendicular to plastic lower housing 235 and includes upright window 232.

Imaging assembly 250 of bioptic barcode reader 200 can include, for example, an image sensor 260 mounted on a printed circuit board 255 and, since plastic lower housing 235 is plastic rather than metal, printed circuit board 255 can be mounted directly to plastic lower housing 235. Alternatively, printed circuit board 255 can be mounted to an intermediate carrier that is then mounted to plastic lower housing 235.

Optical components 265 can include, for example, a mirror arrangement 270 having a splitter mirror 275, a first mirror 280 used to direct at least a portion of a field-of-view of image sensor 260 out of horizontal window 237, and second mirror 285 used to direct at least a portion of the field-of-view of image sensor 260 out of upright window 232. As shown, first mirror 280 can be mounted directly to plastic lower housing 235, which, since plastic lower housing 235 is plastic rather than metal, can reduce or eliminate chipping or damage to first mirror 280. In addition, plastic lower housing 235 can also have additional optical features molded directly into plastic lower housing 235, such as a forward illumination baffle 290 (see FIG. 2) that helps to control illumination stray light that can otherwise scatter. Forming optical features, such as a forward illumination baffle 290, is typically not possible with die cast lower housings due to the accuracy required for the features and the fact that the die cast lower housings are reflective.

Figure 4:
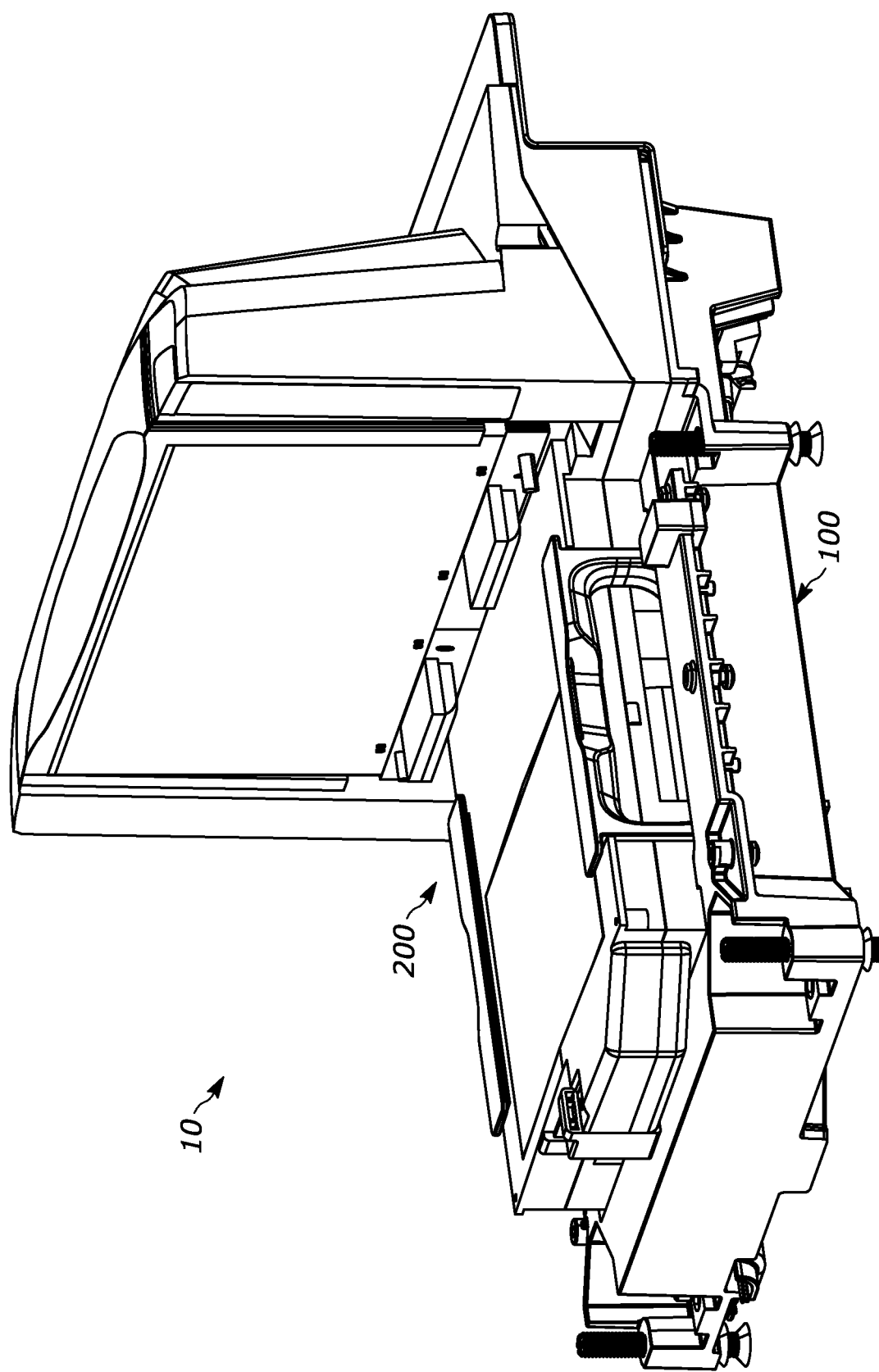
FIG. 4 illustrates a perspective view of an example bioptic barcode reader assembly.

Referring to FIG. 4, an example bioptic barcode reader assembly 10 is shown that generally includes a metal perimeter frame 100 and bioptic barcode reader 200 positioned within and supported by metal perimeter frame 100. Although shown and described with bioptic barcode reader 200, any barcode reader could be used with metal perimeter frame 100 in bioptic barcode reader assembly 10.

Figure 5:
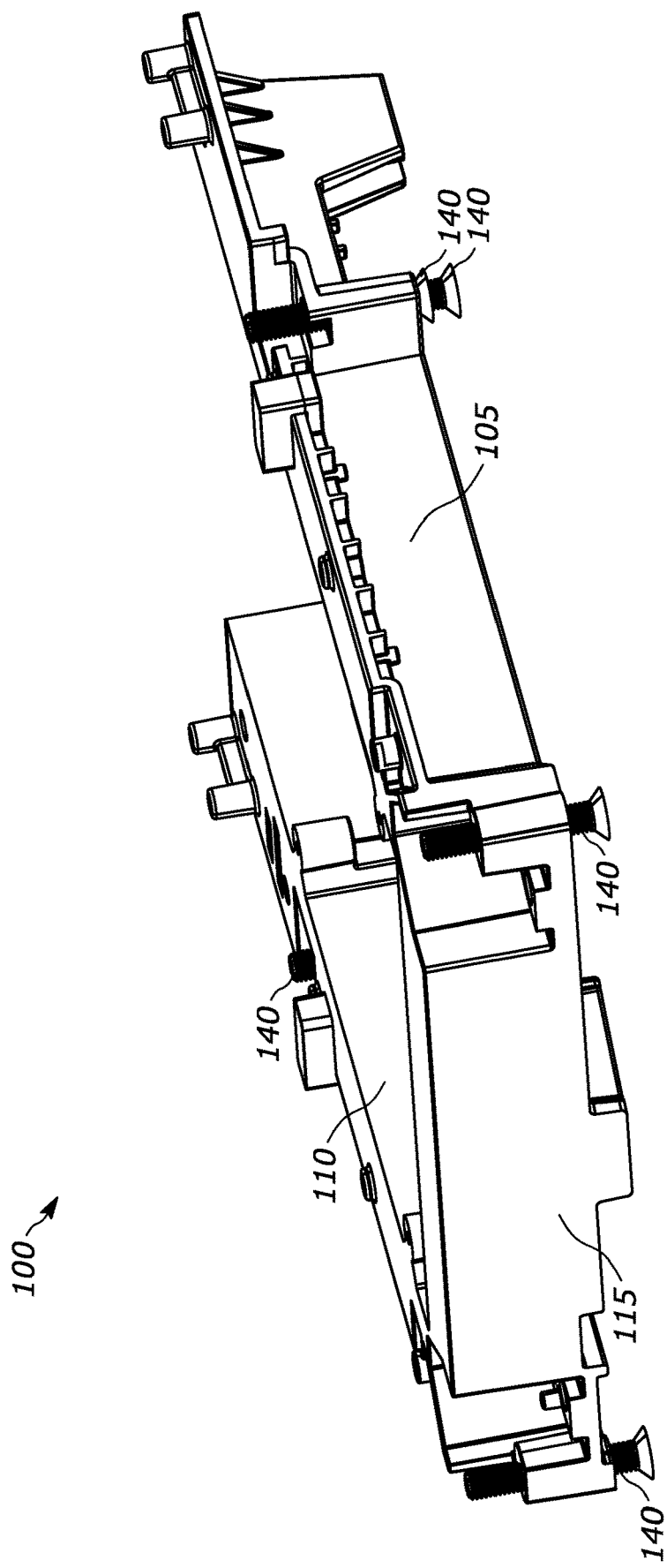
FIG. 5 illustrates a perspective view of an example the metal perimeter frame of the bioptic barcode reader assembly of FIG. 4.
Figure 6:
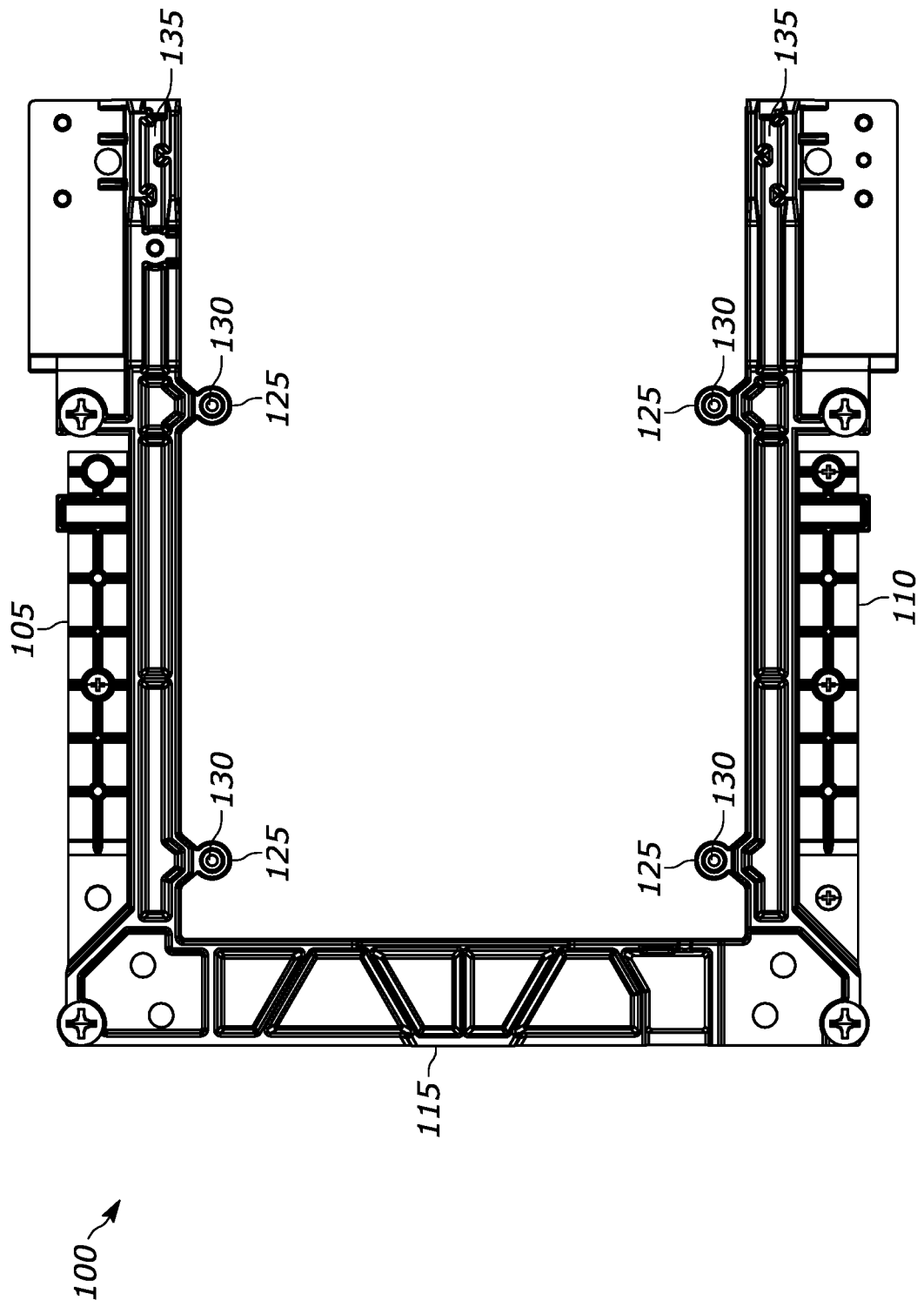
FIG. 6 illustrates a bottom view of the metal perimeter frame of FIG. 5.
Figure 7:
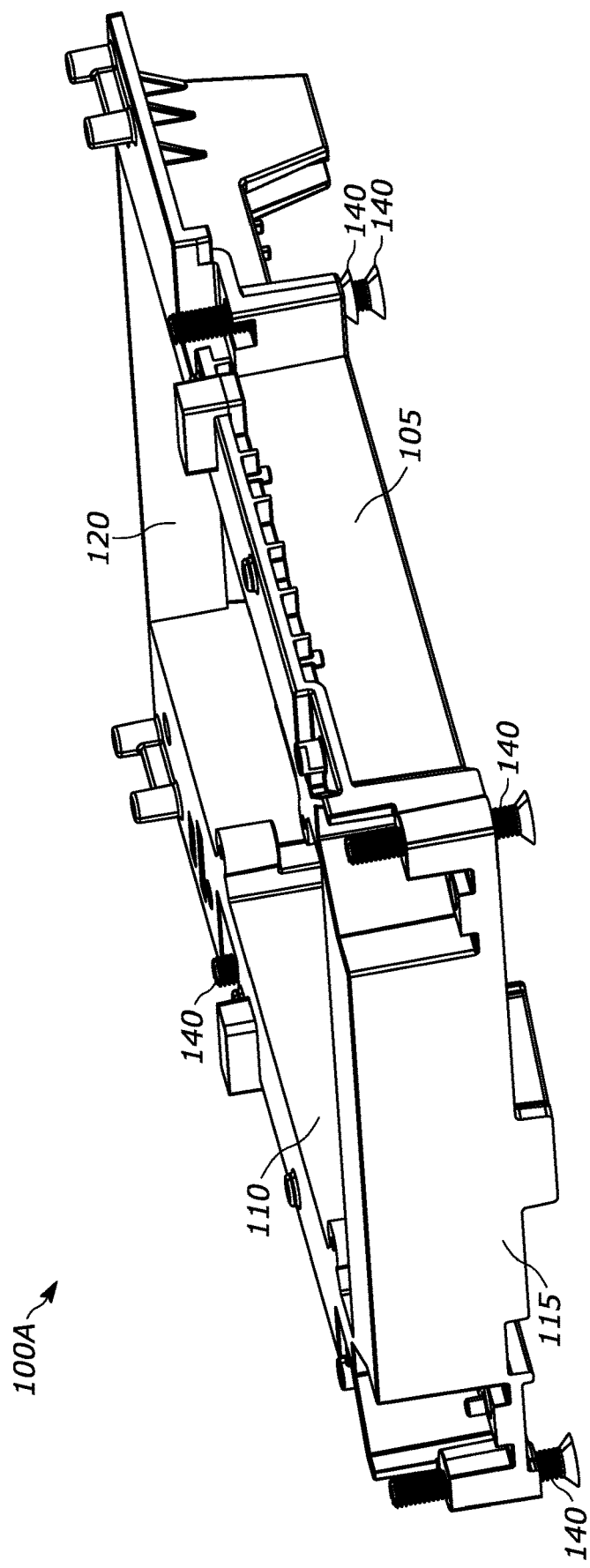
FIG. 7 illustrates a perspective view of another example metal perimeter frame that can be used with the bioptic barcode reader assembly of FIG. 4.

As shown in FIGS. 5-6, metal perimeter frame 100 is, preferably, generally U-shaped and provides structure and support along a first side 205, second side 210, and front end 215 of bioptic barcode reader 200. In this example, metal perimeter frame 100 has a first side arm 105 that is positionable adjacent first side 205 of bioptic barcode reader 200, a second side arm 110 that is positionable adjacent second side 210 of bioptic barcode reader 200, and front arm 115 extending between first side arm 105 and second side arm 110 that is positionable adjacent front end 215 of bioptic barcode reader 200. Alternatively, as shown in FIG. 7, metal perimeter frame 100A can be generally rectangular and provide structure all around the perimeter of bioptic barcode reader 200. In this example, metal perimeter frame 100A has the same first side arm 105, second side arm 110, and front arm 115 as metal perimeter frame 100, but also includes a rear arm 120 that extends between first side arm 105 and second side arm 110 and is adjacent a rear end 220 of bioptic barcode reader 200.

To accurately align and position bioptic barcode reader 200 within metal perimeter frame 100, metal perimeter frame 100 can have a plurality of locators 125 that will align with and engage a plurality of locators 240 on plastic lower housing 235 of bioptic barcode reader 200. As best seen if FIGS. 3 and 6, in the example shown, locators 125 on metal perimeter frame 100 include one or more generally cylindrical protrusions and locators 240 on plastic lower housing 235 include one or more semi-circular apertures that are configured to receive locators 125. Once correctly positioned in metal perimeter frame 100, if desired, bioptic barcode reader 200 can also be secured to metal perimeter frame 100, for example with threaded members 310. In the example shown, threaded members 310 extend through and are received by apertures 130 in locators 125 in metal perimeter frame 100 and can be threaded into apertures 245 in locators 240 in plastic lower housing 235 or pass through apertures 245 and be threaded into apertures in upper housing 230. The use of locators 125, 240 and threaded members 310 allows bioptic barcode reader 200 to be easily removed from metal perimeter frame 100 without having to open housing 225 of bioptic barcode reader 200 or disassemble bioptic barcode reader 200. This is especially convenient if bioptic barcode reader 200 requires service or if bioptic barcode reader 200 needs to be removed to be sent for shipping or service.

Depending on the particular application, metal perimeter frame 100 can also include additional features, such as one or more channels 135 that are configured to receive and guide cables, pass through holes to access housing screws, an attachment feature that allows attachment of a grounding strap or grounding cable, etc. In addition, although not required, metal perimeter frame 100 can also include one or more height adjustable leveling legs 140.

Figure 8:
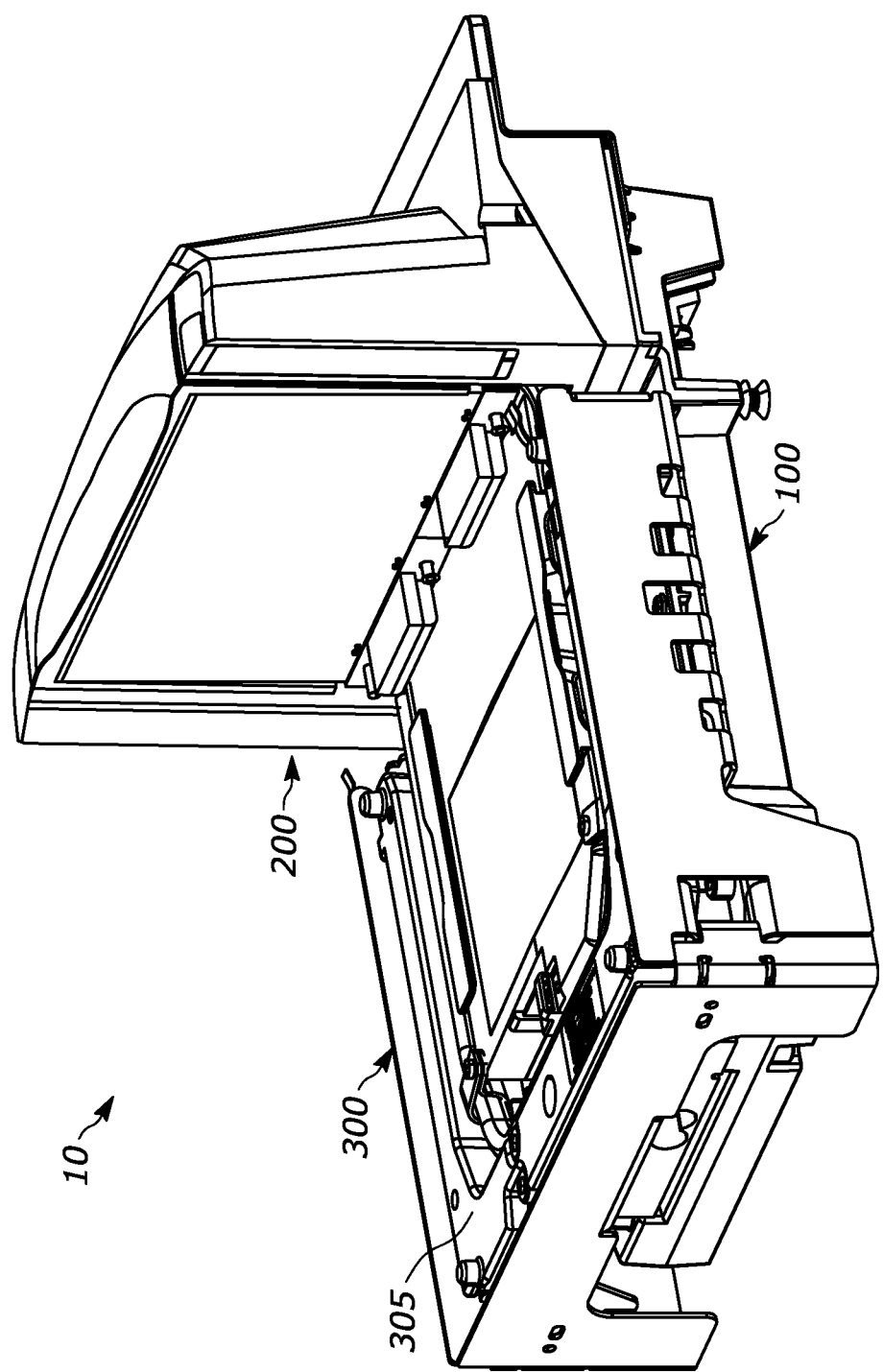
FIG. 8 illustrates a perspective view of the bioptic barcode reader assembly of FIG. 4 with a sheet metal frame and a scale assembly.
Figure 9:
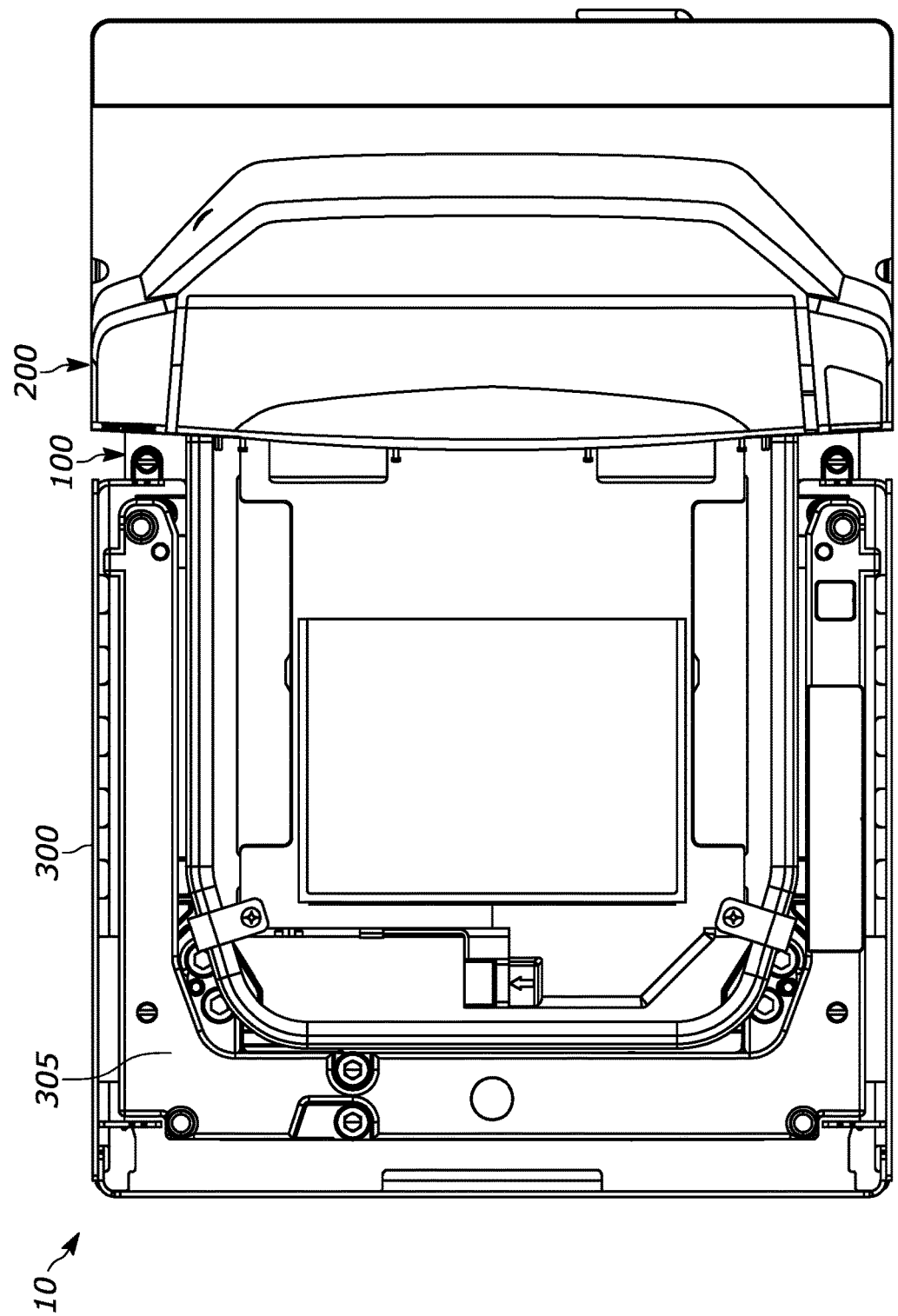
FIG. 9 illustrates a top view of the bioptic barcode reader assembly of FIG. 8.

In addition, as shown in FIGS. 8-9, depending on the application and installation, bioptic barcode reader assembly 10 can also include a sheet metal frame 300 and/or a scale assembly 305, which can be attached to and supported by metal perimeter frame 100. Sheet metal frame 300 can be a single, integral, unitary part or can include multiple parts that are assembled together, as shown. Metal perimeter frame 100 provides the strength necessary to support sheet metal frame 300 and/or a scale assembly 305 with the use of plastic lower housing 235.

To assemble bioptic barcode reader assembly 10, imaging assembly 250 and optical components 265 are positioned within housing 225 and upper housing 230 is secured to plastic lower housing 235, for example, with one or more threaded members. Bioptic barcode reader 200 is then positioned within metal perimeter frame 100, 100A such that bioptic barcode reader 200 is supported by metal perimeter frame 100, 100A. When positioning bioptic barcode reader 200 into metal perimeter frame 100, 100A, locators 125 on metal perimeter frame 100 can be aligned with locators 240 on plastic lower housing 235 to accurately position bioptic barcode reader 200 within metal perimeter frame 100, 100A. Once positioned, bioptic barcode reader 200 can then be secured to metal perimeter frame 100, 100A, for example, with threaded members 310, as discussed above. If used, sheet metal frame 300 and/or scale assembly 305 can also be attached to metal perimeter frame 100, 100A such that metal perimeter frame 100 supports scale assembly 305.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader assembly, comprising:
a metal perimeter frame; and
a bioptic barcode reader including an upper housing and a plastic lower housing secured to the upper housing, the bioptic barcode reader being positioned within and supported by the metal perimeter frame,
wherein the metal perimeter frame is U-shaped and has a first side arm adjacent a first side of the bioptic barcode reader, a second side arm adjacent a second side of the bioptic barcode reader, and a front arm that extends between the first side arm and the second side arm and is adjacent a front end of the bioptic barcode reader.

2. The bioptic barcode reader assembly of claim 1, wherein the metal perimeter frame is removable from the bioptic barcode reader without opening the bioptic barcode reader.

3. The bioptic barcode reader assembly of claim 1, wherein the metal perimeter frame includes a plurality of first locators that align with and engage a plurality of second locators on the lower housing of the bioptic barcode reader to accurately position the bioptic barcode reader within the metal perimeter frame.

4. The bioptic barcode reader assembly of claim 1, wherein the metal perimeter frame is secured to the bioptic barcode reader with threaded members.

5. The bioptic barcode reader assembly of claim 4, wherein the metal perimeter frame includes a plurality of first locators that align with and engage a plurality of second locators on the lower housing of the bioptic barcode reader, the first locators each include an aperture to receive a threaded member, and the second locators each include an aperture to receive the threaded member.

6. The bioptic barcode reader assembly of claim 1, wherein the metal perimeter frame includes a channel configured to receive and guide a cable.

7. The bioptic barcode reader assembly of claim 1, comprising a sheet metal frame attached to the metal perimeter frame.

8. The bioptic barcode reader assembly of claim 1, comprising a scale assembly attached to and supported by the metal perimeter frame.

9. A method of assembling a bioptic barcode reader assembly, comprising the steps of:
assembling a bioptic barcode reader having an upper housing and a plastic lower housing secured to the upper housing;
aligning a plurality of first locators on a metal perimeter frame with a plurality of second locators on the bioptic barcode reader to accurately position the bioptic barcode reader within the metal perimeter frame; and positioning the bioptic barcode reader within the metal perimeter frame such that the bioptic barcode reader is supported by the metal perimeter frame.

10. The method of claim 9, comprising the step of securing the bioptic barcode reader to the metal perimeter frame with threaded members.

11. The method of claim 9, comprising the step of attaching a sheet metal frame to the metal perimeter frame.

12. The method of claim 11, comprising the step of attaching a scale assembly to the metal perimeter frame such that the scale assembly is supported by the metal perimeter frame.

13. A bioptic barcode reader assembly, comprising:
a metal perimeter frame; and
a bioptic barcode reader including an upper housing and a plastic lower housing secured to the upper housing, the bioptic barcode reader being positioned within and supported by the metal perimeter frame,
wherein the metal perimeter frame is rectangular and has a first side arm adjacent a first side of the bioptic barcode reader, a second side arm adjacent a second side of the bioptic barcode reader, a front arm that extends between the first side arm and the second side arm and is adjacent a front end of the bioptic barcode reader, and a rear arm that extends between the first side arm and the second side arm and is adjacent a rear end of the bioptic barcode reader.

14. A bioptic barcode reader assembly, comprising:
a metal perimeter frame; and
a bioptic barcode reader including an upper housing and a plastic lower housing secured to the upper housing, the bioptic barcode reader being positioned within and supported by the metal perimeter frame,
wherein the metal perimeter frame includes a plurality of first locators that align with and engage a plurality of second locators on the lower housing of the bioptic barcode reader to accurately position the bioptic barcode reader within the metal perimeter frame.

\* \* \* \* \*